(12) United States Patent
Brill et al.

(10) Patent No.: US 12,007,282 B2
(45) Date of Patent: Jun. 11, 2024

(54) INSTRUMENT MONITORING

(71) Applicant: DATACOLOR INC., Lawrenceville, NJ (US)

(72) Inventors: Michael H. Brill, Kingston, NJ (US); Zhiling Xu, Princeton Junction, NJ (US); Kathleen A. Edwards, Pennington, NJ (US)

(73) Assignee: DATACOLOR INC., Lawrenceville, NJ (US)

( * ) Notice: Subject to any disclaimer, the term of this patent is extended or adjusted under 35 U.S.C. 154(b) by 6 days.

(21) Appl. No.: 17/687,005

(22) Filed: Mar. 4, 2022

(65) Prior Publication Data
US 2023/0280212 A1    Sep. 7, 2023

(51) Int. Cl.
*G01J 3/52* (2006.01)
*G01J 3/50* (2006.01)

(52) U.S. Cl.
CPC .............. *G01J 3/524* (2013.01); *G01J 3/501* (2013.01)

(58) Field of Classification Search
CPC .......... G01J 3/524; G01J 3/501; G01J 3/0251; G01J 3/0254; G01J 2001/0481; G01N 2201/065; G01N 21/55; G01N 21/57; G01N 21/25; G01N 21/251; G01N 21/255; G01N 21/274
See application file for complete search history.

(56) References Cited

U.S. PATENT DOCUMENTS

| | | | |
|---|---|---|---|
| 5,754,283 A | 5/1998 | Keane et al. | |
| 6,088,117 A * | 7/2000 | Imura | G01J 3/0254 250/228 |
| 6,876,448 B2 * | 4/2005 | Imura | G01J 3/0254 250/252.1 |
| 6,917,429 B2 * | 7/2005 | Imura | G01J 3/524 356/417 |
| 7,230,707 B2 * | 6/2007 | Ingleson | G01N 21/255 356/402 |
| 7,652,755 B2 * | 1/2010 | Liu | G01N 21/87 356/30 |
| 2005/0134853 A1 | 6/2005 | Ingleson et al. | |

FOREIGN PATENT DOCUMENTS

| | | | |
|---|---|---|---|
| EP | 3256825 A1 | 12/2017 | |
| WO | 2017/135956 A1 | 8/2017 | |
| WO | WO-2021208349 A1 * | 10/2021 | ............ G01J 1/0295 |

OTHER PUBLICATIONS

Barlow, R. E. & Irony, T. Z. (1992) "Foundations of statistical quality control" in Ghosh, M. & Pathak, P.K. (eds.) Current Issues in Statistical Inference: Essays in Honor of D. Basu, Hayward, CA: Institute of Mathematical Statistics, 99-112.
Extended European Search Report of European Application No. 23159902.8 dated Dec. 11, 2023 (8 pages).

* cited by examiner

*Primary Examiner* — Maurice C Smith
(74) *Attorney, Agent, or Firm* — Leason Ellis LLP

(57) ABSTRACT

A method has been developed to monitor the aging of an illuminator (such as a lamp) and the interior sphere wall in a sphere-based color measurement instrument. This monitoring process or method is configurable to independently monitor the aging of the illuminator as well as the aging of the interior surface of a color measurement device using standard calibration measurements already present in the color measurement device.

20 Claims, 4 Drawing Sheets

INSTRUMENT MONITORING

FIELD OF THE INVENTION

The present invention is directed to apparatus, systems and methods for monitoring the performance of a light or color measurement device.

BACKGROUND OF THE INVENTION

Sphere based color measurement instruments are widely used in the industry. For example, Datacolor Inc. currently manufactures high performance color measurement devices, such as the DC1000 spectrophotometers. Such devices typically include both an illuminator, such as a lamp, and an integrating sphere or other measurement enclosure. Depending on the frequency of the usage and the cleanliness of the working environment, both the lamp and the sphere will inevitably age. Eventually, both the lamp and the sphere will no longer be suitable to provide accurate color measurements of a sample and will need to be replaced.

In order to know when these components should be replaced, monitoring the aging of the lamp and the sphere is conducted in order to maintain the performance of the instrument. One method of monitoring lamp and sphere aging is to have a service expert or other individual perform a visual inspection, or take some extra measurements, to evaluate the status of the lamp and/or the sphere. However, currently in the art, there is no established method to monitor the aging process automatically or remotely. Further, different processes lead to aging of the lamp and the sphere. Therefore, these two separate components typically require different service intervals and approaches to determine if they are beyond their useful lifespan.

Thus, what is needed in the art is a system, method and computer implemented process that allows for a quantitative assessment of the performance, over time, of the illuminator and the sphere. Additionally, what is needed in the art is an approach that can remotely monitor the performance of a color measurement device and determine when one or more components of the color measurement device should be replaced.

SUMMARY OF THE INVENTION

In the disclosure provided herein, the apparatus, systems and methods are directed to improved monitoring of the components of color measurement devices. In one particular implementation, a method is provided to monitor the aging of a lamp and an enclosure. By way of non-limiting example, a method is provided to monitor the aging of an illuminator and an interior surface of a sphere-based color measurement instrument. In a particular implementation, the method includes collecting measurements obtained from a sample channel sensor signal and a reference channel sensor signal during a calibration process at different times. For example, the method includes obtaining both a sample channel signal and a reference channel signal during one or more white tile calibration processes. In one particular implementation, the method includes monitoring the change of the reflectance of the sphere wall as a function of time. The method also includes monitoring the change of the spectral power distribution of an illuminator (such as a lamp) as a function of time. In a further implementation, a processor is used to determine, based on the change of reflectance of the sphere wall over time, that the sphere wall needs replacing. In a further implementation, a processor is used to determine, based on the change in spectral power distribution of the lamp over time, that the lamp needs replacing. In one or more implementations, a white calibration tile is used in the calibration process, and the white calibration tile needs to remain stable over time. In one or more alternative implementations, where a calibration tile is replaced with a different stable calibration tile (but both are substantially similar in color), the provided method can monitor the aging of the lamp and sphere, as long as the reflectance data of the different tiles can be traced to the same source.

In one or more further implementations, a color measurement device is provided where the color measurement device includes a measurement enclosure, at least one illuminator, a sample sensor, a reference sensor, and at least one processor, wherein the processor is configured to receive a sample signal from the sample sensor and a reference signal from the reference sensor when a calibration target is placed within a sample area of the enclosure. The processor is further configured to determine, using the reference signal and sample signal, at least the spectral power distribution of the at least one illuminator and at least a reflectance value of the interior of the measurement enclosure. In one particular implementation, the processor is further configured to determine from a plurality of derived spectral power distributions obtained over time when the illuminator no longer provides a consistent measurement and when the reflectance of the enclosure has decreased below a pre-set threshold.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

Figure 1:
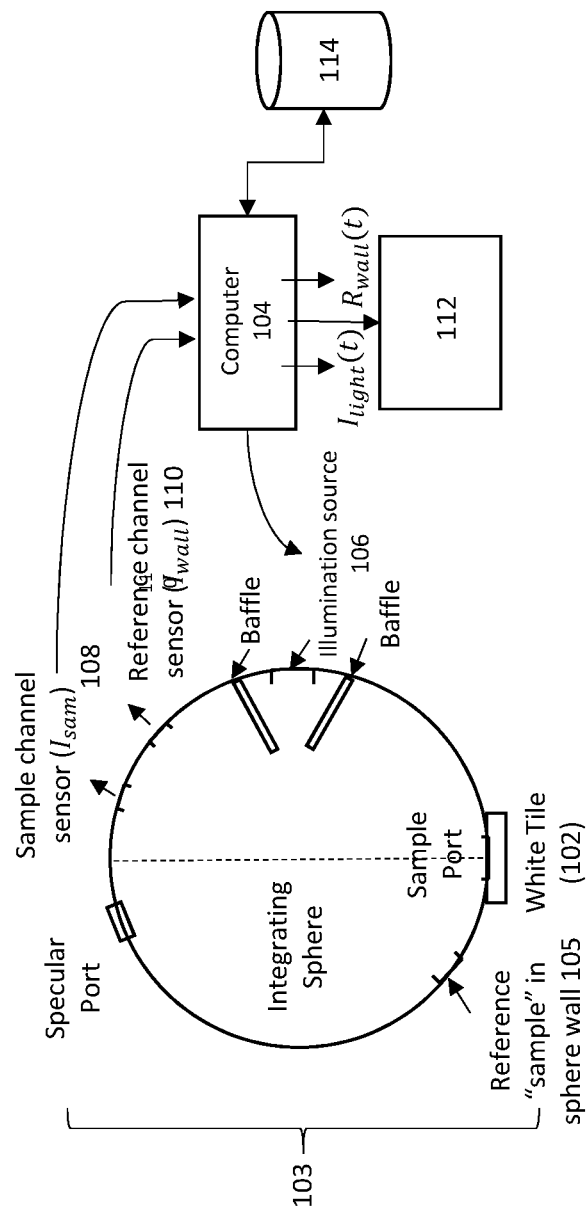
FIG. 1 details one or more components of the color measurement instrument monitoring system as described herein.

By way of overview and introduction, various embodiments of the apparatus, systems and methods described herein are directed towards monitoring, using existing infrastructure, the performance and quality of components used in color measurement devices.

Specifically, in one or more implementations, a method is provided to monitor the aging of an illuminator (such as a lamp) and the interior sphere wall in a sphere-based color measurement instrument. This monitoring process or method is configurable to independently monitor the aging of the illuminator as well as the aging of the interior surface of a color measurement device using standard calibration measurements and components present in the color measurement device.

In one particular implementation, a method includes collecting a sample channel signal and a reference channel signal during the color measurement device's calibration process. These signals are obtained each time the calibration process is initiated. By obtaining a collection of sample channel and reference channel signals at different times during the operational life of the color measurement device, the change of the reflectance of the sphere wall as a function of time can be monitored. At the same time, the change of the spectral power distribution of the lamp as a function of time can also be monitored. In one or more implementations, the method provided uses a stable white calibration tile that will remain stable over the service life of the color measurement device. However, if the calibration tile is replaced with a different stable white tile, as long as the reflectance data of the different white tiles can be traced to the same source, this method is still valid if the white tile data is properly adjusted.

For a sphere-based color measurement instrument, typically there is a sample channel and a reference channel. The sample channel is used to collect a signal from the sample to be measured. During calibration, the sample is typically a white ceramic tile. The reference channel is used to collect a signal from a small part of the wall of the integrating sphere in a region which is not directly illuminated by the lamp. The ratio of the sample channel signal and reference channel signal is often used to eliminate the fluctuation of the lamp, or lamp+sphere if there's any change on the sphere. This works well within a short time frame (usually within several hours), during which the sphere is typically stable, and any fluctuation of the lamp can be cancelled out. However, over a much longer time frame (usually several years), both the lamp and the sphere will age, and as a result, the spectral power distribution of the lamp output will change, and the reflectance spectrum of the sphere will also change. The reference channel signal collected at different times during that long time frame can provide some information about aging of the lamp and the interior surface of the measurement enclosure. However, since the reference channel signal is a result of the combined illumination of the lamp and the sphere, it cannot be used to monitor the status of the lamp and the sphere separately. Therefore, the described approach uses both the reference channel and sample channel measurements of a calibration target to generate values for the reflectance spectra of the interior of the measurement enclosure as well as the spectral power distribution of the illuminator.

Referring now to the drawings, in which like reference numerals refer to like elements, FIG. 1 illustrates devices and components for obtaining color measurement data that interface over one or more data communication networks in accordance with one or more implementations of the present application.

As shown, FIG. 1 illustrates a color measurement instrument configuration arranged to obtain a measurement of a sample 102. In one or more particular implementations, the light measurement device includes a measurement enclosure 103. For example, as shown in FIG. 1, an integrating sphere is used to enclose various components provided herein. In one or more configurations, the measurement enclosure 103 includes one or more illuminators (106), as well as at least one sample channel sensor (108), at least one reference channel sensor (110), and at least one sample port. In one or more implementations, the measurement enclosure 103 also includes specular port. In a further arrangement, the measurement enclosure 103 also includes baffles to prevent illumination from traveling directly from the illuminator 106 to either the sensors (108 and 110) or the sample port.

Further, the portion of the interior surface (herein referred to the reference sample area 105) of the measurement enclosure 103 that is opposite the reference sensor 110 needs to be baffled. In this configuration, reference sample area 105 of the inner surface of the measurement enclosure 103 is configured such that light that is reflected off this reference sample area 105 has previously reflected off another portion of the inner surface of the measurement enclosure 103.

In one or more implementations, the sample 102 can be any type or form of physical article having color or spectral properties in need of analysis. In one implementation, the sample 102 is a calibration article. Here, the calibration article has specific properties making it suitable for stable measurements over time. For instance, the sample 102 is a ceramic calibration tile. In one or more further implementations, the sample 102 is a white ceramic calibration tile. For ease of reference and discussion, the foregoing descriptions refer to the sample 102 as a white calibration tile. However, it will be appreciated by those possessing an ordinary level of skill in the requisite art that any article, material or device that has stable and uniform color with known color properties can be used in the described systems, apparatus, methods and processes.

With continued reference to FIG. 1, the white calibration tile 102 is placed such that the white calibration tile 102 can be illuminated by at least one (1) illuminator 106. For example, the white calibration tile 102 is placed at the sample port of the measurement enclosure 103 such that light reflected off the surface of the measurement enclosure 103 strikes the white calibration tile 102 placed at the sample port.

In one or more implementations or embodiments, the illuminator is one or more commercially available lighting sources. For instance, the illuminator 106 is a single lighting element. However, in alternative implementations, the illuminator 106 is a collection of separate lighting devices that are configurable to produce a light with certain spectral power distributions. For instance, the illuminator 106 can, in one implementation, be one or more discrete light emitting elements, such as LEDs or OLEDs; fluorescent, halogen, xenon, neon, mercury, metal halide, HPS, or incandescent lamps; or other commonly known or understood lighting sources. In one arrangement, the illuminator 106 is one or more broad-band LEDs.

In one or more implementations, the illuminator 106 includes a lens, filter, screen, enclosure, or other elements (not shown) that are utilized in combination with the light source of the illuminator 106 to direct a beam of illumination, at a given wavelength, to the interior of the measurement enclosure 103.

In one implementation, the illuminator 106 is operable or configurable by an internal processor or other control circuit. Alternatively, the illuminator 106 is operable or configurable by a remote processor or control device having one or more linkages or connections to the illuminator 106. As shown in FIG. 1, the illuminator 106 is directly connected to a processor or computer 104.

In one or more implementations the illuminator 106 is positioned relative to the sample 102 to ensure that light directly emitted by the illuminator 106 does not strike the sample 102. For example, as shown in FIG. 1, baffles are used to direct the light emitted by the illuminator to the interior surface of the enclosure 103 and away from the sample 102. Once light is reflected off the interior surface of the measurement enclosure 103, it strikes the surface of the calibration tile (sample) 102.

Continuing with FIG. 1, light reflected off the sample 102 (such as a white calibration tile) is captured or measured by a sample sensor 108. Here, the sample sensor 108 can be a color sensor or image capture device. For example, the sample sensor 108 is a scientific CMOS (Complementary Metal Oxide Semiconductor), CCD (charge coupled device), colorimeter, spectrometer, spectrophotometer, photodiode array, or other light sensing device and any associated hardware, firmware and software necessary for the operation thereof. In one particular implementation, the sample sensor 108 is a multi-channel spectral sensor or similar device.

In one or more implementations, light reflected off the interior of the enclosure, such as the reference sample area (105), is captured or measured by the reference sensor 110. Here, the reference sensor 110 can be a color sensor or image capture device. For example, the reference sensor 110 is a scientific CMOS (Complementary Metal Oxide Semiconductor), CCD (charge coupled device), colorimeter, spectrometer, spectrophotometer, photodiode array, or other light sensing device and any associated hardware, firmware and software necessary for the operation thereof. In one particular implementation, the reference sensor 110 is a multi-channel channel spectral sensor or similar device. In one or more implementations, the sample sensor 108 and reference sensor 110 described herein, have 40 optical, NIR or other wavelength channels to evaluate a given wavelength range, however, other potential sensor configurations and wavelength channels are understood and appreciated.

In a particular implementation, the sample sensor 108 and reference sensor 110 are configured to generate an output signal upon light striking a light sensing portion thereof. By way of non-limiting example, both the sample sensor 108 and reference sensor 110 are configured to output signals in response to light that has been reflected off the sample 102 or reference sample area 105 and then strikes a light sensor or other sensor element integral or associated with sample sensor 108 and reference sensor 110.

For instance, the sample sensor 108 and reference sensor 110 are configured to generate a digital or analog signal that corresponds to the wavelength or wavelengths of light that are captured or received by the sample sensor 108 and reference sensor 110. In one or more configurations, the sample sensor 108 and reference sensor 110 are configured to output spectral information, RGB information, or another form of multi-wavelength data representative of light reflected off the sample 102 and the reference sample area 105 of the enclosure.

Figure 2:
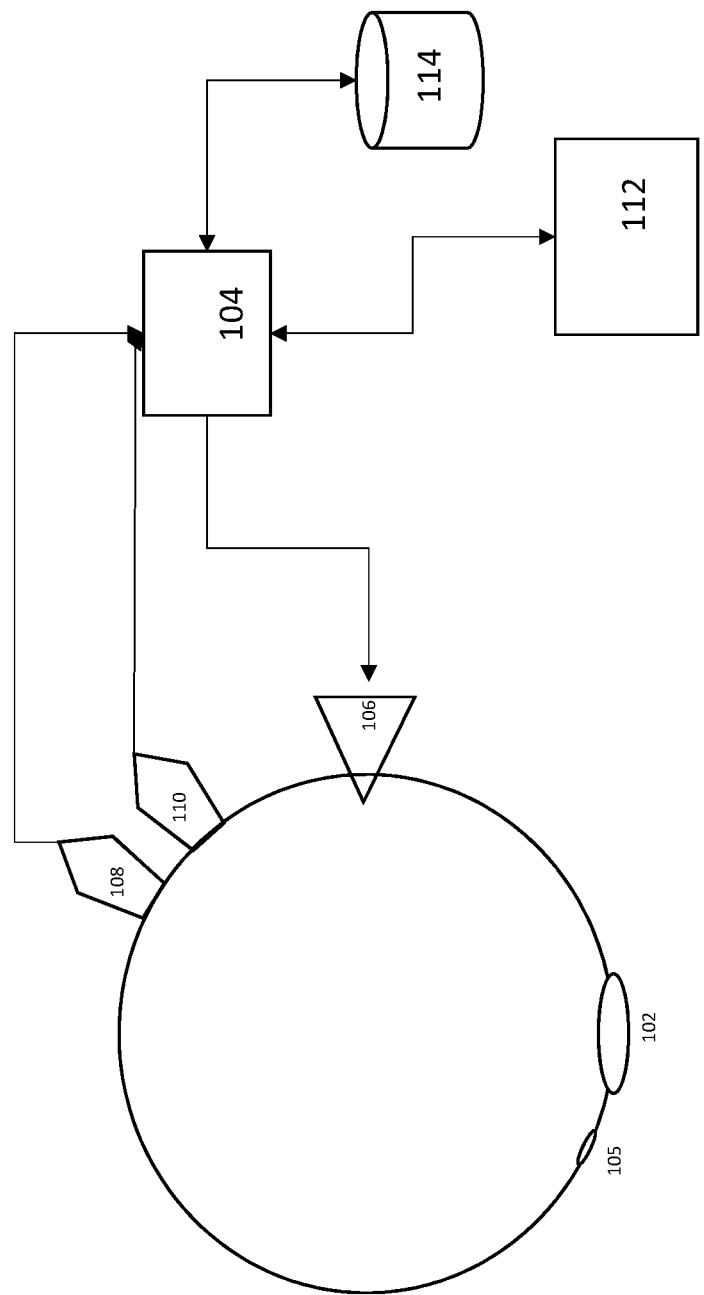
FIG. 2 details one or more components of the color measurement instrument monitoring system as described herein.

As shown in FIGS. 1 and 2, the sample sensor 108 and reference sensor 110 are configured to transmit one or more measurements to a processing platform, such as processor 104. In one or more configurations, the sensors are directly connected to the processor 104. However, in one or more implementations, the sensors 108 and 110 are equipped or configured with network interfaces or protocols usable to communicate over a network, such as the internet. In this configuration, measurements made by the sensors 108 and 110 are sent to a remote processor for evaluation and analysis.

Alternatively, the sample sensor 108 and reference sensor 110 are connected to one or more computers or processors, such as processor 104, using standard interfaces such as USB, FireWire, Wi-Fi, Bluetooth, and other wired or wireless communication technologies suitable for the transmission measurement data.

Figure 3:
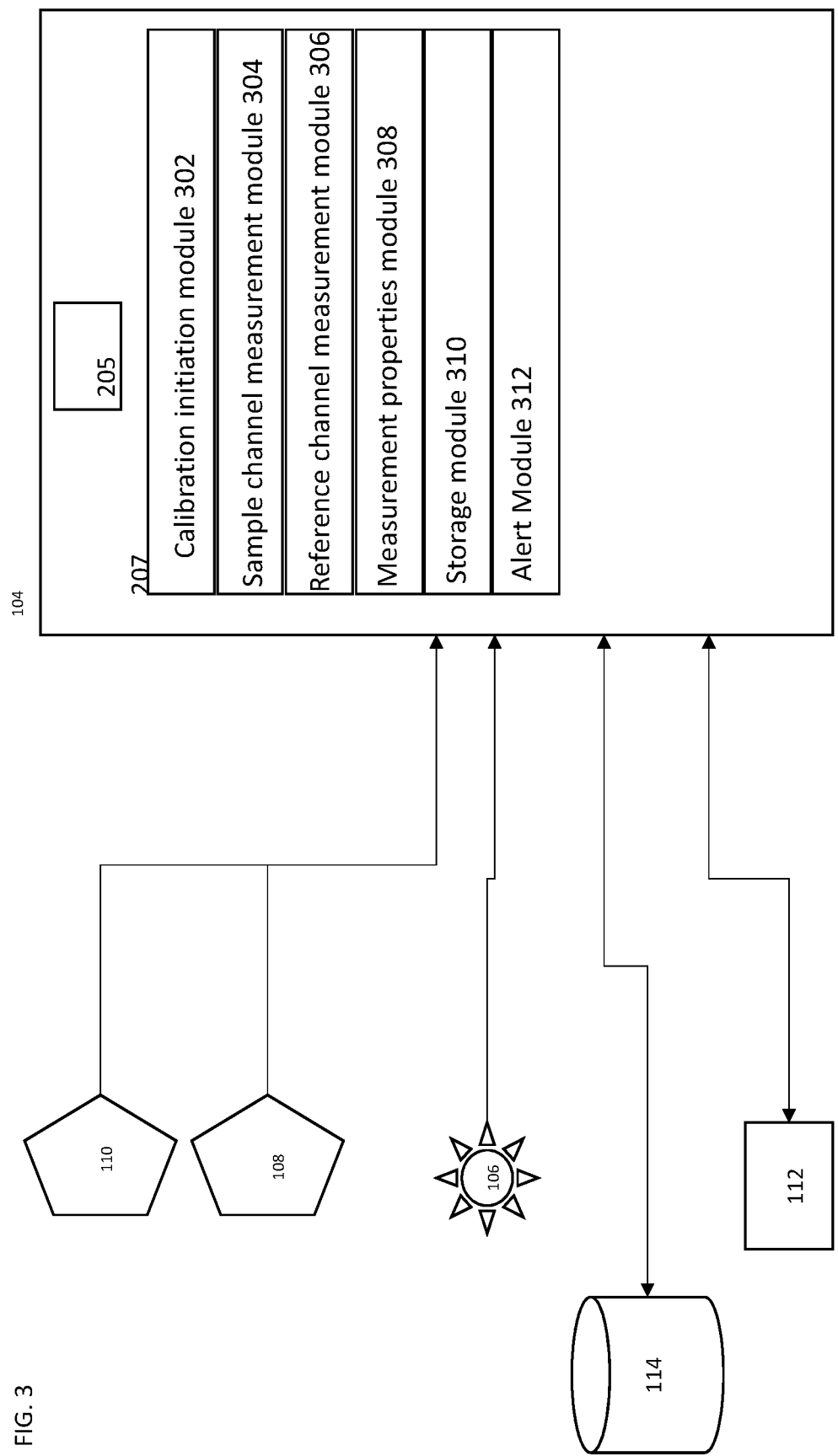
FIG. 3 details the module diagram of the color measurement instrument monitoring system as described herein.

The output signal generated by the sample sensor 108 and reference sensor 110 are transmitted to one or more processor(s) 104 for evaluation as a function of one or more hardware or software modules. As used herein, the term "module" refers, generally, to one or more discrete components that contribute to the effectiveness of the presently described systems, methods and approaches. Modules can include software elements, including but not limited to functions, algorithms, classes and the like. In one arrangement, the software modules are stored as software 207 in the memory 205 of the processor 104, as shown in FIG. 3. Modules also include hardware elements substantially as described below. In one implementation, the processor 104 is located within the same device as the measurement enclosure 103, such as within the form factor of a color measurement device. However, in another implementation, the processor 104 is remote or separate from the color measurement device and communicates over one or more communication linkages.

In one configuration, the processor 104 is configured through one or more software modules to generate, calculate, process, output or otherwise manipulate the output signals generated by the sample sensor 108 and reference sensor 110.

In one implementation, the processor 104 is a commercially available computing device. For example, the processor 104 may be a collection of computers, servers, processors, cloud-based computing elements, micro-computing elements, computer-on-chip(s), home entertainment consoles, media players, set-top boxes, prototyping devices or "hobby" computing elements.

Furthermore, the processor 104 can comprise a single processor, multiple discrete processors, a multi-core processor, or other type of processor(s) known to those of skill in the art, depending on the particular embodiment. In a particular example, the processor 104 executes software code on the hardware of a custom or commercially available cellphone, smartphone, notebook, workstation or desktop computer configured to receive data or measurements captured by the color measurement device 103 either directly, or through a communication linkage.

The processor 104 is configured to execute a commercially available or custom operating system, e.g., Microsoft Windows, Apple OSX, UNIX or Linux based operating system in order to carry out instructions or code.

In one or more implementations, the processor 104 is further configured to access various peripheral devices and network interfaces. For instance, the processor 104 is configured to communicate over the internet with one or more remote servers, computers, peripherals or other hardware using standard or custom communication protocols and settings (e.g., TCP/IP, etc.).

The processor 104 may include one or more memory storage devices (memories). The memory is a persistent or non-persistent storage device (such as an IC memory element) that is operative to store the operating system in addition to one or more software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 104 provides for the storage of application program and data files. One or more memories provide program code that the processor 104 reads and executes upon receipt of a start, or initiation signal.

The computer memories may also comprise secondary computer memory, such as magnetic or optical disk drives or flash memory, that provide long term storage of data in a manner similar to a persistent memory device. In one or more embodiments, the memory of the processor 104 provides for storage of an application program and data files when needed.

As shown in FIG. 2, the processor 104 is configured to store data either locally in one or more memory devices. Alternatively, the processor 104 is configured to store data, such as measurement data or processing results, in a local or remotely accessible database 108. The physical structure of the database 114 may be embodied as solid-state memory (e.g., ROM), hard disk drive systems, RAID, disk arrays, storage area networks ("SAN"), network attached storage ("NAS") and/or any other suitable system for storing computer data. In addition, the database 114 may comprise caches, including database caches and/or web caches. Programmatically, the database 114 may comprise flat-file data store, a relational database, an object-oriented database, a hybrid relational-object database, a key-value data store such as HADOOP or MONGODB, in addition to other systems for the structure and retrieval of data that are well known to those of skill in the art. The database 114 includes the necessary hardware and software to enable the processor 104 to retrieve and store data within the database 114.

In one implementation, each element provided in FIG. 1 and FIG. 2, is configured to communicate with one another through one or more direct connections, such as though a common bus. Alternatively, each element is configured to communicate with the others through network connections or interfaces, such as a local area network LAN or data cable connection. In an alternative implementation, the sample sensor 108 and reference sensor 110, processor 104, and database 114 are each connected to a network, such as the internet, and are configured to communicate and exchange data using commonly known and understood communication protocols.

In a particular implementation, the processor 104 is a computer, workstation, thin client or portable computing device such as an Apple iPad/iPhone® or Android® device or other commercially available mobile electronic device configured to receive and output data to or from database 114, the sample sensor 108 and reference sensor 110.

In one arrangement, the processor 104 communicates with a local or remote display device 112 to transmit, displaying or exchange data. In one arrangement, the display device 112 and processor 104 are incorporated into a single form factor, such as a color measurement device, such as a spectrometer, that includes an integrated display device. In an alternative configuration, the display device 112 is a remote computing platform such as a smartphone or computer that is configured with software to receive data generated and accessed by the processor 104. For example, the processor 104 is configured to send and receive data and instructions from a processor(s) of a remote computing device 112. This remote display device 112 includes one or more display devices configured to display data obtained from the processor 104. Furthermore, the display device 112 is also configured to send instructions to the processor 104. For example, where the processor 104 and the display device are wirelessly linked using a wireless protocol, instructions can be entered into the display device 112 that are executed by the processor. The display device 112 includes one or more associated input devices and/or hardware (not shown) that allow a user to access information, and to send commands and/or instructions to the processor 104. In one or more implementations, the display device 112 can include a screen, monitor, display, LED, LCD or OLED panel, augmented or virtual reality interface or an electronic ink-based display device.

Those possessing an ordinary level of skill in the requisite art will appreciate that additional features, such as power supplies, power sources, power management circuitry, control interfaces, relays, adaptors, and/or other elements used to supply power and interconnect electronic components and control activations are appreciated and understood to be incorporated.

Figure 4:
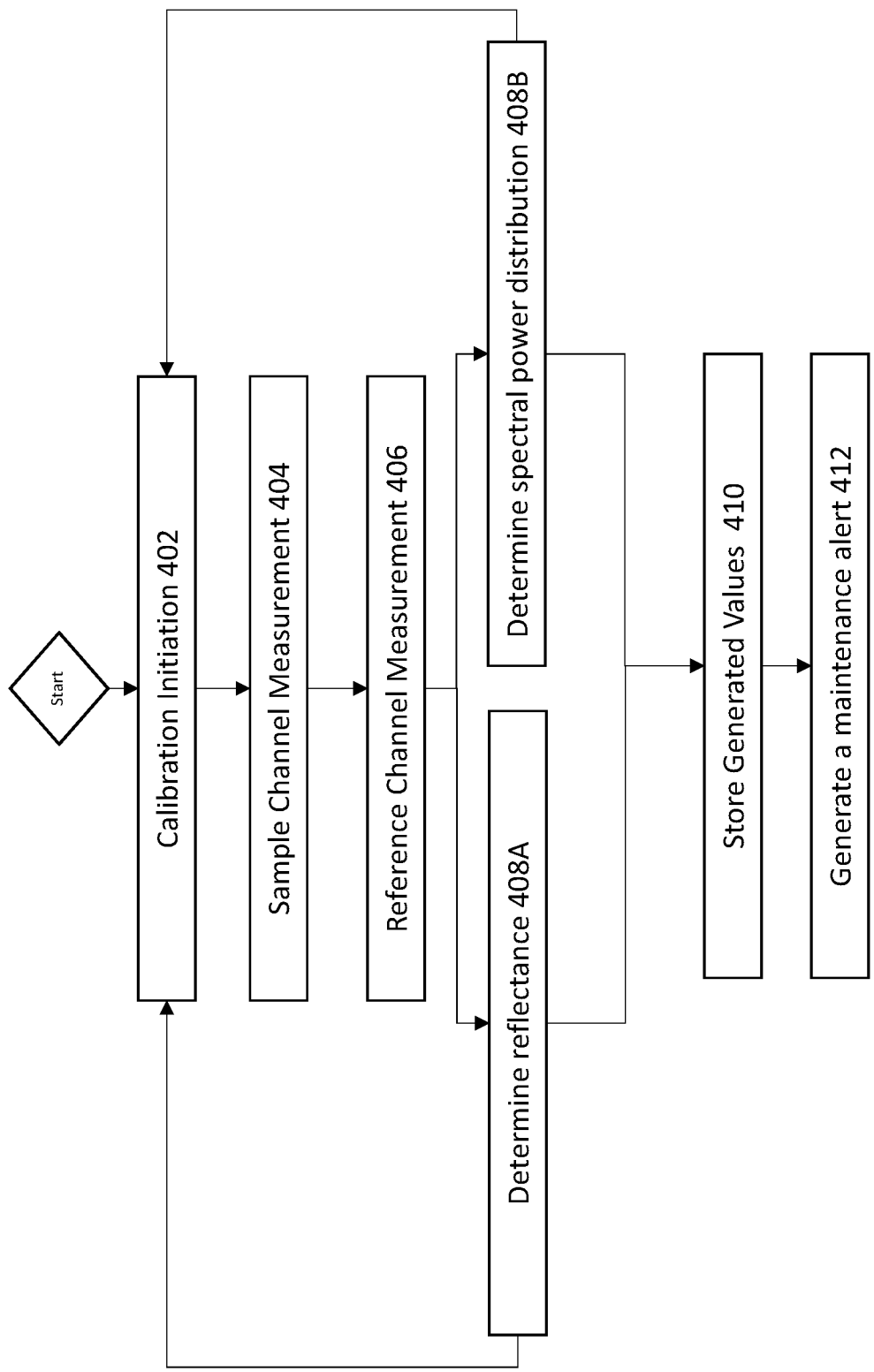
FIG. 4 provides a flow diagram of the measurement monitoring process described herein.

Turning now to the overview of the operation of the system described in FIGS. 3 and 4, the processor 104 is configured to implement or evaluate the output of the sample sensor 108 and reference sensor 110 to determine the state of the interior of the measurement enclosure 103 and/or the illuminator 106. For example, the sample sensor 108 and reference sensor 110 outputs were obtained over time. Using these measurements, the status of the illuminator 106 and the status of the interior of the measurement enclosure 103 can be determined and evaluated.

With particular reference to FIGS. 3 and 4, during the operational life of an enclosure-based color measurement device, the color measurement device is calibrated. While the foregoing implementations are directed to sphere-based color measurement instruments, it will be understood and appreciated that any enclosure-based color measurement instrument that has characteristics substantially similar to an integrating sphere-based color measurement is also understood and appreciated.

As further described herein, the described illuminator and enclosure monitoring can be implemented during the calibration process of an enclosure-based color measurement device. It will be appreciated that the foregoing example uses a single wavelength for analysis. However, multiple wavelength-based analysis is understood and appreciated.

As shown in FIG. 4, a calibration process or procedure is initiated by the enclosure-based color measurement device. In one or more implementations, as part of the color measurement process, the color measurement device collects measurements of a calibration target (such as sample 102) using a sample channel and a reference channel. The sample channel (obtained from the sample sensor 108) corresponds to the signal from the sample 102 to be measured. During instrument calibration, the sample 102 is typically a white ceramic tile. The reference sensor 110 generates a signal that corresponds to light that has been reflected off a reference area 105 of the sphere wall (in configurations using an integrating sphere), where 105 is located away from direct illumination of the illuminator 106. The processor 104 is configured to use the ratio of the sample channel signal and reference channel signal to eliminate the fluctuation of the illuminator, or lamp+sphere if there's any change on the sphere.

However, as noted, such an approach cannot separate the lamp fluctuation from sphere aging. To improve the ability to separately determine the condition of the lamp and the interior surface, the color measurement device can be configured to separately monitor the lamp aging and sphere wall aging using the sample channel signal, the reference channel signal, and a white calibration tile. For the ease of discussion, the foregoing methods discuss using a single wavelength measurement, but the method is valid for other wavelengths and can readily cover the measurement range of the instrument.

In one or more implementations, the processor 104 is configured by a calibration initiation module 302 to initiate a calibration process, as shown in step 402. In one particular implementation, the calibration module causes the processor 104 to activate the illuminator 106 to illuminate the interior of the measurement enclosure and the sample 103. By way of further implementations, the calibration initiation module 302 generates a signal that is sent to the illuminator 106 that causes the illuminator to activate.

Turning now to step 404, the processor 104 is configured by a sample channel measurement module 304. The sample channel measurement module 304 configures the processor to receive a signal generated by the sample channel sensor 108 in response to the illumination generated by the illuminator 106. For example, the processor 104 is configured to receive and store within a memory (such as memory 205), the signal generated by the sample channel sensor 108. Here the signal generated by the sample channel sensor 108 is the output generated when light reflected off the sample 102 strikes the sample channel sensor 108.

Turning now to step 406, the processor 104 is configured with a reference channel measurement module 306. The reference channel measurement module 306 configures the processor 104 to receive a signal generated by the sample channel sensor 108 in response to the illumination generated by the illuminator. For example, the processor 104 is configured to receive and store within a memory the signal generated by the reference channel sensor 110. Here the signal generated by the reference channel sensor 110 is the output generated when light that has been reflected off a portion of the interior surface of the measurement enclosure 103 (but not the calibration tile) strikes the reference channel sensor 110.

Once the signals from the sample sensor 108 and the reference sensor 110 are obtained and stored by the processor 104, the reflectance of the measurement enclosure 103 and the spectral power of the illuminator 106 can be derived by the processor 104. As shown in step 408, the processor is configured with a measurement properties module 308. Here, the measurement properties module 308 configures the processor 104 to generate values for either the reflectance of the measurement enclosure 103, the spectral power of the illuminator 106 or both. In one or more further implementations, the measurement properties module 308 is further configured to obtain additional measurements and derive additional values. In one particular implementation, the measurement properties module 308 is configured to use the sample channel signal and the reference channel signal to derive the measurement properties of interest.

For example, and with reference to FIGS. 1, 3 and 4, the following relationships can be established using the measured values obtained from the sample sensor 108 and the reference sensor 110:

Isam(*t*)=raw signal of white tile(sample channel)as a function of time *t*;

Iwall(*t*)=raw signal of enclosure(sphere)wall(reference channel)as a function of time *t*;

Ilamp(*t*)=lamp(illuminator 106)light intensity as a function of time *t*, assumed to be spatially uniform over the sample and sphere wall;

Rsam=reflectance of sample(the white tile)which is assumed to be constant with time; and Rwall(*t*)=reflectance of sphere wall(reference channel)as a function of time *t*, assumed to be spatially uniform over the entire enclosure(sphere) wall.

In one particular implementation, the processor 104 is configured by one or more submodules of the measurement properties module 308 to determine or derive the lamp-independent reflectance Rwall(t) and the direct-path lamp intensity Ilamp(t) in terms of the measured quantities Isam(t), Iwall(t) and the reflectance Rsam of the calibration tile. The processor 104 is configured by one or more submodules of the measurement properties module 308 to determine, for a given calibration measurement:

$$\text{Isam}(t) = k1 * \text{Ilamp}(t) * \text{Rwall}(t) * \text{Rsam} \tag{1}$$

$$\text{Iwall}(t) = k2 * \text{Ilamp}(t) * \text{Rwall}(t) * \text{Rwall}(t) \tag{2}$$

where k1 and k2 are time-independent system parameters that will cancel out. It will be further appreciated that in the foregoing discussion, the term "Equation [x] gives us a way to do [y]" means that, on the right-hand side of [x], all the variables are measurable, and their values can be accessed through normal operation of the color measurement instrument; and the left-hand side is a commonly accepted metric for the behavior being monitored per task [y]. For example, where task [y] is to monitor the lamp spectral power distribution change or the sphere reflectance change, each as a function of time, the provided equations configure the processor 104 to generate the commonly accepted metric.

Here, it will be appreciated that equation (1) represents the raw signal intensity of the sample channel, and equation (2) represents the raw signal intensity of the reference channel. The term Rwall(t) in equation (1) and the first Rwall(t) in equation (2) show that the general illumination for both the sample channel and the reference channel is related to sphere wall reflectance, and the second Rwall(t) in equation (2) shows that the reference channel signal is also related to the reflectance of the particular part of reference channel sphere wall, just like the sample channel signal is related to the sample reflectance Rsam in equation (1).

Therefore, the relationship between these measurements can be provided as:

$$\frac{Iwall(t)}{Isam(t)} = \frac{k2 * Rwall(t)}{k1 * Rsam} \tag{3}$$

and thus $$Rwall(t) = \frac{k1 * Iwall(t) * Rsam}{K2 * Isam(t)} \tag{4}$$

From this relationship, the processor 104 is configured by one or more submodules of the measurement properties module 308 to determine that:

$$Rwall(t) = Rwall(0) * \frac{Iwall(t)/Isam(t)}{Iwall(0)/Isam(0)} \tag{5}$$

It will further be appreciated that by replacing Rwall(t) in equation (1) with equation (5), the processor 104, by operation of one or more submodules of the measurement properties module 308, is configured to determine that:

$$Isam(t) = k1 * Ilamp(t) * Rwall(0) * \frac{Iwall(t)/Isam(t)}{Iwall(0)/Isam(0)} * Rsam \tag{6}$$

Therefore, at t=0, the processor 104, by operation of one or more submodules of the measurement properties module 308, can be configured to establish that:

$$Isam(0) = k1 * Ilamp(0) * Rwall(0) * \frac{Iwall(0)/Isam(0)}{Iwall(0)/Isam(0)} * Rsam \quad (7)$$

Equations (6) and (7) further provides:

$$Ilamp(t) = Ilamp(0) * \frac{Isam(t)^2}{Isam(0)^2} * \frac{Iwall(0)}{Iwall(t)} \quad (8)$$

If Ilamp(0) and Iwall(0) are known (e.g., provided in the factory or supplied from a stored memory device, network connection or database), then equation (5) gives a suitably configured processor 104 an algorithm to evaluate and track the reflectance change of the sphere (as shown in step 408A), and equation (8) gives a suitably configured processor an algorithm to evaluate and track the lamp light intensity (spectral power distribution) change (as shown in step 408B). If Rwall(0) and Ilamp(0) are inaccessible in these equations, the relative values Rwall' and Ilamp' can still be useful to the determination of the aging of the components under analysis. In that case, the computational form of the algorithms used by a suitably configured processor 104 can be provided as:

$$Rwall'(t) = \frac{Iwall(t)/Isam(t)}{Iwall(0)/Isam(0)} \quad (5')$$

$$Ilamp'(t) = \frac{Isam(t)^2}{Isam(0)^2} * \frac{Iwall(0)}{Iwall(t)} \quad (8')$$

Here, Rwall'(t) and Ilamp'(t) are values of Rwall(t) and Ilamp(t) relative to their (unknown) values at t=0.

In one or more implementations, the values for Rwall'(t) and Ilamp'(t) are between 0 and 1. In one or more particular implementations, a threshold value for a failure, or significant performance degradation, of the lamp or the enclosure can be set at 80%. This is, where the value for Rwall'(t) and Ilamp'(t) is less than 80% relative to the values at t=0, such a measurement would indicate a failure condition of the respective lamp or enclosure.

Likewise, in one or more implementations, if the values for Rwall(t) and Ilamp(t) drop to less than 80% of the initial values Rwall(0) and Ilamp(0) at t=0, such a measurement would indicate a failure condition of the respective lamp or enclosure. In a further implementation, the failure condition for Rwall is referenced to a perfect reflecting diffuser instead of to Rwall(0), and the failure condition for Ilamp is referenced to the maximum intensity from the lamp reflected from the perfect reflecting diffuser instead of to Ilamp(0).

In one or more implementations, the values for Rwall(0) and Ilamp(0) are used to evaluate the aging of an enclosure surface or lamp independent of knowledge of Rwall(0) and Ilamp(0). Here, cross-ratios are used to compare two wavelengths, $\lambda 1$ and $\lambda 2$, at two times, t1 and t2. For example, such a cross-ratio for Rwall could be implemented by one or more suitably configured processors to determine the cross-ratio according to:

$$\text{Cross-Ratio} = Rwall(t1, \lambda 1)Rwall(t2, \lambda 2)/[Rwall(t1, \lambda 2)Rwall(t2, \lambda 1)]$$
$$= Rwall'(t1, \lambda 1)Rwall'(t2, \lambda 1)/[Rwall'(t1, \lambda 2)Rwall'(t2, \lambda 1)].$$

Here, the unknown values Rwall(0, $\lambda 1$) and Rwall(0, $\lambda 2$) cancel, so it is not necessary to know the value for Rwall(0). For t2>t1 and $\lambda 2>\lambda 1$, a large value for Cross-Ratio can be interpreted as reflective of a progressive yellowing of the sphere (relative decrease of Rwall at the lower wavelength $\lambda 1$). Thus, a large Cross-Ratio value can be indicative of sphere or enclosure aging. For example, and in no way limiting, a selected sampling wavelength for lambda1 is 450 nm (a blue), and lambda2 is 610 nm (a red-orange). Both t1 and t2 can be selected for times that are separated by about 6 months to a year. However, in alternative configuration, a multiple of this time range can be selected so as to assess a cumulative effect on the components.

In a further arrangement, a cross-ratio for Ilamp(t) can be determined by substituting Ilamp(t) for Rwall(t) and Ilamp'(t) for Rwall'(t) in the cross-ratio equitation provided. Therefore, a suitably configured processor is configured to determine a cross-ratio value using Rwall values and a separate cross-ratio using Ilamp values.

In one or more arrangements, using the above parameters for lambda1, lambda2, t1, and t2, a suitably configured processor will determine a cross-ratio value for Rwall of between 0.8 and 1.25 for an enclosure that is operating normally. A cross-ratio value that is outside of this range would be indicative of degradation of the performance of the enclosure.

It will be appreciated that alternative values and thresholds for both Rwall and Ilamp cross-ratios can be determined based on different values for lambda 1, lambda 2, t1 and t2. As such, alternative thresholds are understood to be determined by the input parameters. The thresholds and logic leading to them are the subject of statistical process control, which is known to persons possessing an ordinary level of skill in the requisite art. Such statistical process control approaches are provided in Barlow, R. E. & Irony, T. Z. (1992) "Foundations of statistical quality control" in Ghosh, M. & Pathak, P. K. (eds.) Current Issues in Statistical Inference: Essays in Honor of D. Basu, Hayward, CA: Institute of Mathematical Statistics, 99-112, which is herein incorporated by reference as if presented in its entirety.

Although the case of unknown Iwall(0) or Ilamp(0) can be useful in assessing aging of the enclosure or lamp via equation 5' or 8', it is more desirable to pre-store or estimate Iwall(0) and Ilamp(0) and proceed with equations 5 and 8. In one or more implementations, the processor 104 is configured to access from a memory the values for Iwall(0) and Isam(0). Using these accessed values, the values for Rwall(t) and Ilamp(t) at given time t are derived. For example, in one arrangement during an initial calibration of a color measuring device, the values for Iwall(0) and Isam(0) are stored in an accessible memory. Each subsequent calibration process then has access to values for Iwall(0) and Isam(0) and is thus able to derive Rwall(t) and Ilamp(t) for the current calibration process using equations 5 and 8.

In one or more implementations, once the processor 104 has derived the value for Rwall(t) and Ilamp(t), both values are stored in a local or remote database, such as database 114 by a processor 104 configured with a storage module 310. As shown in step 410, the processor 104 is configured by the storage module 310 to store the generated values for Rwall(t) and Ilamp(t) for later review and evaluation. Additionally, values for Isam(t) and Iwall(t) are also stored for access and retrieval. In this way, over the operational life of the color measurement device, a collection of Rwall(t) and Ilamp(t) values are obtained and stored, as well as the underlying raw measurements used to obtain these values.

In one or more further implementations, the derived values for Rwall(t) and Ilamp(t) can be evaluated against a threshold value to determine whether the measurement enclosure 103 and/or the illuminator 106 are in need of maintenance or replacing. In one or more implementations, once the processor 104 has derived the values Rwall(t) and Ilamp(t) at a given time, these values can be evaluated against a threshold value to determine whether the measurement enclosure 103 and/or the illuminator 106 are in need of replacing. For example, as shown in step 412, an alert module configures the processor 104 to determine if the values of Rwall(t) and Ilamp(t) indicate that either the illuminator 106 and/or the measurement enclosure 103 will need maintenance. For example, the processor 104 is configured to determine if the value for Rwall(t) and Ilamp(t) relative to prior values at t=0 is less than 80%. For example, where the processor is configured to store a value for t=0, a threshold for Rwall(t) or Ilamp(t) at time t is 80%. Alternatively, a threshold alert can be set where the value for Rwall(t) and Ilamp(t) changes more than 1%, 5%, 10%, 15%, 20% or 30% between t=0 and t. In another configuration, the threshold value is determined based on a stored or prior cross-ratio value for Rwall or Ilamp.

Where the processor 104 determines that the change of Rwall(t) and Ilamp(t) exceeds any provided or calculated threshold value, such a determination is indicative that either the illuminator 106 and/or the measurement enclosure 103 will need maintenance. Once the processor 104 has evaluated the values Rwall(t) and Ilamp(t) and determined that the values exceed the pre-determined threshold value, the alert module 312 causes the processor to generate an alert or notification to inform a user that the illuminator 106 and/or the measurement enclosure needs maintenance, service, or replacement.

In a further arrangement, values for Rwall(t) and Ilamp(t) can be stored by the processor 104. Here, the processor 104 is configured to evaluate Rwall(t) and Ilamp(t) values obtained over a given time (such as 1, 3, 5, or 7 months, quarters, or years). For example, the processor 104 is configured to evaluate the change in the values for Rwall(t) and Ilamp(t) over successive calibrations and use the change in Rwall(t) and Ilamp(t) values over time to determine if the enclosure or the illuminator needs maintenance or replacement. For example, if the difference between a current measurement of Rwall(t) and Ilamp(t) relative to prior measurements of Rwall(t) and Ilamp(t) is greater than 1%, 5%, 10%, 15%, 20% or 30%, then the processor 104 is configured to generate an alert.

In an alternative configuration, the alert module 312 is configured to send an alert to one or more remote computing systems. By way of example, the alert module 314 configures the processor 104 to send a pre-formatted or dynamically generated message to a remote display device or computer 112. For example, one or more remote computers 112 or monitoring platforms are configured to receive a data file or notification about each Rwall(t) and Ilamp(t) value generated during the operational life of a color measurement device. The remote computer or monitoring platform is configured such that it can directly determine if Rwall(t) and Ilamp(t) values represent a color measurement device in need of maintenance. Such a received data file or message will contain information about the Rwall(t) and Ilamp(t) values obtained and if they have exceeded the pre-determined threshold. Alternatively, the remote computer 112 is configured to receive the alert notification that a given color measurement device is in need of maintenance.

While the foregoing process utilizes the same calibration target (white tile) during the operational life of the color measurement device, the described process is also suitable for use with different calibration tiles during the operational life of the device. If for any reason, a different calibration white tile is used, if the two tiles can be traced to the same source, i.e., the reflectance of the two white tiles is comparable, the sample channel signal can then be adjusted accordingly, and the monitoring of the sphere and lamp aging is still valid. Where the original white tile has a reflectance value Rsam and the sample channel signal at the beginning is Isam(0), and the new white tile has a reflectance value Rsamnew and the sample channel signal at the beginning is Isamnew(0), then $$\frac{Isam(0)}{Isamnew(0)} = \frac{Rsam}{Rsamnew} \quad (9)$$

From equation (5), it is apparent where the new white tile was used over the entire operational life, the following would be true:

$$Rwall(t) = Rwall(0) * \frac{Iwall(t)/Isamnew(t)}{Iwall(0)/Isamnew(0)} \quad (10)$$

However, Isamnew(0) is unknown because this value is only apparent at a later time (used as a replacement of the original tile, after the instrument has aged relative to its state at t=0). Despite this fact, considering equation (9), the processor 104 can be configured to provide:

$$Rwall(t) = Rwall(0) * \frac{Iwall(t)/Isamnew(t)}{Iwall(0)/Isam(0)} * \frac{Rsamnew}{Rsam} \quad (11)$$

Here, equation (11) provides an algorithm to configure the processor 104 to monitor the aging of the sphere wall (or other measurement enclosure) when a new calibration white tile is used during the operational life of the color measurement device.

Similarly, equation (8) becomes:

$$Ilamp(t) = Ilamp(0) * \frac{Isamnew(t)^2}{Isam(0)^2} * \frac{Iwall(0)}{Iwall(t)} * \frac{Rsam^2}{Rsamnew^2} \quad (12)$$

Equation (12) thus provides the processor 104 with an algorithm executable to monitor the aging of the lamp when a new calibration white tile is used during the operational life of the color measurement device.

Furthermore, if the color measurement instrument is adjusted during a service visit, as long as the white calibration tile is stable before and after service, the processor is configurable by the storage module 310 to record the reference and sample signals and determine that the change of the reflectance of the sphere and spectral power distribution of the illuminator are part of the aging process. Thus, the presently described process is able to accurately monitor the aging process of the color measurement instrument across service activities that change the lamp or sphere, such as adjusting the voltage or cleaning the sphere.

If the sample channel and reference channel data can be accessed remotely from the location where the instrument is calibrated, the method disclosed here can be used to remotely monitor the aging of the sphere wall and the illuminator 106 separately and can provide valuable information about the condition of the instrument. This information can be useful for planning the timing and type of maintenance interventions, which can differ for the sphere and the lamp.

It is also possible to iterate the method described herein to adjust to a new white tile and compensate a still newer tile's reflectance Rsamnewer to match Rsamnew. Where the reflectance Rsam is constant in time (t) over the service time in which the particular white tile is being used; a new tile will have a reflectance Rsamnew that is constant during its own term of service. Here, the processor is configured to scale Rsamnew to a digitally stored measurement of Rsam. Over an instrument's lifetime, it is understood that calibration tile replacement is infrequent since tile materials are traditionally selected for robustness and color consistency over time.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter have been described in this specification. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems cited throughout this application are incorporated by reference herein. Citation of any above publications or documents is not intended as an admission that any of the foregoing is pertinent prior art, nor does it constitute any admission as to the contents or date of these publications or documents. All references cited herein are incorporated by reference to the same extent as if each individual publication and reference were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. A method of monitoring components of a color measurement device comprising:
   illuminating, with at least one illuminator, a sample using a measurement enclosure at a first time and at a second time wherein the second time is later than the first time;
   obtaining, from at least one sample channel sensor using at least one processor, a first sensor output signal generated from measuring light reflected off the sample at the first time and a second sensor output signal generated from measuring light reflected off the sample at the second time;
   obtaining, from at least one reference channel sensor using at least one processor, a first reference output signal generated from measuring light reflected off a portion of the measurement enclosure at the first time and a second reference output signal generated from measuring light reflected off the portion of the measurement enclosure at the second time; and
   determining, using at least one processor, at least one of a reflectance value for the portion of the measurement enclosure and at least one lamp intensity value for the at least one illuminator based on at least the first and second sample sensor output signal measurements and the first and second reference output signal measurements.

2. The color measurement method of claim 1, wherein the reflectance value of the portion of the measurement enclosure Rwall(t) is obtained according to:

$$Rwall(t) = Rwall(0) * \frac{Iwall(t)/Isam(t)}{Iwall(0)/Isam(0)}$$

where Isam(0) is the raw signal of the sample obtained from the sample channel sensor at a first time and Isam(t) is the raw signal of the sample obtained from the sample channel sensor at the second time, Iwall(0) is the raw signal of the portion of the measurement enclosure obtained by the reference channel sensor at the first time and Iwall(t) is the raw signal of the portion of the measurement enclosure obtained by the reference channel sensor at the second time.

3. The color measurement method of claim 1, wherein the lamp intensity value Ilamp(t) is obtained according to:

$$Ilamp(t) = Ilamp(0) * \frac{Isam(t)^2}{Isam(0)^2} * \frac{Iwall(0)}{Iwall(t)}$$

where Isam(0) is the raw signal of the sample obtained from the sample channel sensor at a first time and Isam(t) is the raw signal of the sample obtained from the sample channel sensor at the second time, Iwall(0) is the raw signal of the portion of the measurement enclosure obtained by the reference channel sensor at the first time and Iwall(t) is the raw signal of the portion of the measurement enclosure obtained by the reference channel sensor at the second time.

4. The color measurement method of claim 1, further comprising comparing the at least one reflectance value for the reference area and the at least one lamp intensity value to a threshold value, and where at least one reflectance value for the reference area and the at least one lamp intensity value exceeds the threshold value; and generating an alert for display on a display device.

5. The color measurement method of claim 1, wherein the processor is further configured to store the at least one reflectance value for the reference area and the at least one lamp intensity value in at least one data storage device.

6. The color measurement method of claim 1, wherein the processor is further configured to transmit the at least one reflectance value for the reference area and the at least one lamp intensity value to at least one remote processor.

7. The color measurement method of claim 1, wherein the sample is a white calibration tile.

8. The color measurement method of claim 1, further comprising:
obtaining a reflectance value and a lamp intensity value at a first measurement time (t1) and a second measurement time (t2) for a first wavelength ($\lambda 1$) and a second wavelength ($\lambda 2$);
calculating a Cross-Ratio according to:

Cross−Ratio = $Rwall(t1, \lambda 1)Rwall(t2, \lambda 2)/[Rwall(t1, \lambda 2)Rwall(t2, \lambda 1)]$ = $Rwall'(t1, \lambda 1)Rwall'(t2, \lambda 1)/[Rwall'(t1, \lambda 2)Rwall'(t2, \lambda 1)]$, comparing, for t2>t1 and $\lambda 2>\lambda 1$, the Cross-Ratio value to a pre-determined threshold, and generating least one of an alert for display on a display device, a data value for storage in a data storage device, and a data value for transmission to a remote processor where the Cross-Ratio value exceeds the pre-determined threshold.

9. The color measurement method of claim 8, wherein Rwall(t) is obtained according to:

$$Rwall(t) = Rwall(0) * \frac{Iwall(t)/Isam(t)}{Iwall(0)/Isam(0)},$$

and wherein Ilamp(t) is obtained according to:

$$Ilamp(t) = Ilamp(0) * \frac{Isam(t)^2}{Isam(0)^2} * \frac{Iwall(0)}{Iwall(t)}$$

where Isam(0) is the raw signal of the sample obtained from the sample channel sensor at a first time and Isam(t) is the raw signal of the sample obtained from the sample channel sensor at a later time, Iwall(0) is the raw signal of the portion of the measurement enclosure obtained by the reference channel sensor at the first time and Iwall(t) is the raw signal of the portion of the measurement enclosure obtained by the reference channel sensor at the later time.

10. A color measurement system comprising:
an enclosure, the enclosure having at least one illuminator;
at least one sample channel sensor for measuring light reflected off a sample positioned at a sample port of the enclosure at the first time and a second sensor output signal generated from measuring light reflected off of the sample at a second time, wherein the second time is later than the first time;
at least one reference channel sensor for measuring light reflected off of a portion of the enclosure at the first time and a second reference output signal generated from measuring light reflected off the portion of the enclosure at the second time; and
a processor, configured to receive the first and second sample signal and the first and second reference signal and determine at least one of a reflectance value for the portion of the measurement enclosure and at least one lamp intensity value for the at least one illuminator based on at least the first and second sample sensor output signal measurements and the first and second reference output signal measurements.

11. The color measurement system of claim 10, wherein the reflectance value of the reference area Rwall(t) is obtained according to:

$$Rwall(t) = Rwall(0) * \frac{Iwall(t)/Isam(t)}{Iwall(0)/Isam(0)}$$

where Isam(0) is the raw signal of the sample obtained from the sample channel sensor at a first time and Isam(t) is the raw signal of the sample obtained from the sample channel sensor at the second time, Iwall(0) is the raw signal of the portion of the measurement enclosure obtained by the reference channel sensor at the first time and Iwall(t) is the raw signal of the portion of the measurement enclosure obtained by the reference channel sensor at the second time.

12. The color measurement system of claim 10, wherein the lamp intensity value Ilamp(t) is obtained according to:

$$Ilamp(t) = Ilamp(0) * \frac{Isam(t)^2}{Isam(0)^2} * \frac{Iwall(0)}{Iwall(t)}$$

where Isam(0) is the raw signal of the sample obtained from the sample channel sensor at a first time and Isam(t) is the raw signal of the sample obtained from the sample channel sensor at the second time, Iwall(0) is the raw signal of the portion of the measurement enclosure obtained by the reference channel sensor at the first time and Iwall(t) is the raw signal of the portion of the measurement enclosure obtained by the reference channel sensor at the second time.

13. The color measurement system of claim 10, wherein the processor is further configured to store the at least one reflectance value for the reference area and the at least one lamp intensity value in at least one data storage device.

14. The color measurement system of claim 13, wherein the processor is further configured to access at least one of the at least one stored reflectance value for the reference area and a lamp intensity for the at least one illuminator.

15. The color measurement system of claim 14, wherein the processor is further configured to store Isam(0), Isam(t), Iwall(0) and Iwall(t) in a remotely accessible database.

16. The color measurement system of claim 13, wherein the processor is configured to compare the at least one reflectance value for the reference area and the at least one lamp intensity value to a threshold value, and where at least one reflectance value for the reference area and the at least one lamp intensity value exceeds the threshold value, generating an alert for display on a display device.

17. The color measurement system of claim 16, wherein the alert is sent to at least one of a local or remote processor, wherein the alert includes information about the reflectance value for the portion of the measurement enclosure and at least one lamp intensity value for the at least one illuminator.

18. A method of monitoring components of a color measurement device comprising:
illuminating, with at least one illuminator, a first sample placed in a sample port of a measurement enclosure at a first time;
obtaining, using at least one processor, from at least one sample channel sensor, a first sensor output signal generated from measuring light reflected off the sample at the first time;
obtaining, using at least one processor, from at least one reference channel sensor, a first reference output signal generated from measuring light reflected off of a portion of the measurement enclosure at the first time;
illuminating, with at least one illuminator, a second sample placed in a sample port of a measurement enclosure at a second time;
obtaining a second sensor output signal generated from measuring light reflected off of the second sample at the second time;
obtaining a second reference output signal generated from measuring light reflected off the portion of the measurement enclosure at the second time; and
determining, using at least one processor, at least one of a reflectance value for the portion of the measurement enclosure and at least one lamp intensity value for the at least one illuminator based on at least the first and second sensor output signal measurements and the first and second reference output signal measurements.

19. The method of claim 18, wherein the reflectance value of the reference area Rwall(t) is obtained according to:

$$Rwall(t) = Rwall(0) * \frac{Iwall(t)/Isamnew(t)}{Iwall(0)/Isam(0)} * \frac{Rsamnew}{Rsam}$$

where Isam(0) is the raw signal obtained from the sample channel sensor at a first time when measuring the first sample, and Isamnew(t) is the raw signal obtained from measuring the second sample at the second time, Iwall (t) is the raw signal of reference area obtained by the reference channel sensor at the first time and the second time, Rsam is the reflectance of first sample, and Rsamnew is the reflectance value of the second sample.

20. The method of claim 18, wherein the lamp intensity value Ilamp(t) is obtained according to:

$$Ilamp(t) = Ilamp(0) * \frac{Isamnew(t)^2}{Isam(0)^2} * \frac{Iwall(0)}{Iwall(t)} * \frac{Rsam^2}{Rsamnew^2}$$

where Isam(0) is the raw signal obtained from the sample channel sensor at a first time when measuring the first sample, and Isamnew(t) is the raw signal obtained from measuring the second sample at the second time, Iwall (t) is the raw signal of reference area obtained by the reference channel sensor at the first time and the second time, Rsam is the reflectance of first sample, and Rsamnew is the reflectance value of the second sample.

* * * * *